(12) United States Patent
Kaaden

(10) Patent No.: US 6,400,521 B1
(45) Date of Patent: Jun. 4, 2002

(54) PROCESS FOR THE RECORDING OF DIGITAL SIGNALS ON A MAGNETIC TAPE IN MULTIPLE LONGITUDINAL TRACKS AND MAGNETIC-TAPE RECORDING APPARATUS FOR CARRYING OUT THE PROCESS

(75) Inventor: Jürgen Kaaden, Villingen-Schwenningen (DE)

(73) Assignee: Deutsche Thomson-Brandt GmbH, Villingen-Schwenningen (DE)

(*) Notice: Subject to any disclaimer, the term of this patent is extended or adjusted under 35 U.S.C. 154(b) by 795 days.

(21) Appl. No.: 08/686,756

(22) Filed: Jul. 25, 1996

(30) Foreign Application Priority Data

Sep. 21, 1995 (DE) .......................................... 195 35 089

(51) Int. Cl.[7] .......................... G11B 5/03; G11B 5/265; G11B 5/187
(52) U.S. Cl. .......................... 360/66; 360/121; 360/122
(58) Field of Search ...................... 360/46, 66, 121–123

(56) References Cited

U.S. PATENT DOCUMENTS

| | | | | |
|---|---|---|---|---|
| 3,881,192 A | * | 4/1975 | Ballinger | 360/123 |
| 4,480,274 A | * | 10/1984 | Coleman, Jr. | 360/31 |
| 5,124,869 A | * | 6/1992 | Lehureau | 360/121 |
| 5,306,573 A | * | 4/1994 | Pirot et al. | 428/692 |
| 5,392,273 A | * | 2/1995 | Masaki et al. | 369/116 |
| 5,412,518 A | * | 5/1995 | Christner et al. | 360/66 |
| 5,420,734 A | * | 5/1995 | Colineau et al. | 360/121 |
| 5,671,106 A | * | 9/1997 | Lehureau | 360/121 |

OTHER PUBLICATIONS

Method of Optimizing Multitrack, Magnetic Write Head In: IBM Technical Disclosure Bulletin, vol. 32, No. 1, 6/89 S.366, 367.

* cited by examiner

Primary Examiner—Regina Y. Neal
(74) Attorney, Agent, or Firm—Joseph S. Tripoli; Joseph J. Laks; Daniel E. Sragow

(57) ABSTRACT

Magnetic tape recording apparatus comprising a plurality of recording heads for recording digital signals onto a magnetic tape, the recording heads being arranged in a matrix-type structure; and a control unit for electrically compensating for different magnetic properties of the recording heads, the control unit comprising controllable current sources connected to each of the recording heads; at least one non-volatile memory in which is permanently stored individually determined and pre-set magnetizing current values individually corresponding to a particular recording head; and common controller circuit for selectively activating the current sources and the current values stored in the non-volatile memory in dependence on the digital signals to be recorded, wherein upon selection the recording heads are supplied with the stored values of the magnetizing current assigned to them.

12 Claims, 4 Drawing Sheets

PROCESS FOR THE RECORDING OF DIGITAL SIGNALS ON A MAGNETIC TAPE IN MULTIPLE LONGITUDINAL TRACKS AND MAGNETIC-TAPE RECORDING APPARATUS FOR CARRYING OUT THE PROCESS

FIELD OF THE INVENTION

The invention relates to a magnetic recording device having a plurality of recording heads arranged in a matrix-type structure.

BACKGROUND OF THE INVENTION

In digital magnetic tape recording systems for audio, video or data signals, helical-track recording and longitudinal-track recording processes are known. In longitudinal-track recording, multitrack recording is becoming increasingly significant. In addition to the classic formats S-DAT and DCC, mention should be made here of a new type of format which, by means of a head produced by thin-film technology, allows simultaneous area-like recording of up to 2000 tracks. This system is known as SDVCR. The potential of this system is particularly great in combination with an optical reading system, since small track widths of 2 μm can be achieved and the storage density can be many times greater than in current systems.

The publication by Francouis Maurice "Towards the Multitrack Digital Video Tape Recorder", J. Magn. Soc. Jpn, Vol. 15, Sup. No. 51 (1991), pages 389–394, discloses a process for recording digital signals on a magnetic tape in multiple longitudinal tracks by means of recording heads arranged in a matrix. The matrix comprises a ferrite block which is provided with grooves in the longitudinal and transverse directions and to which there is applied a thin-film structure, which contains the magnetically effective gaps. If current is passed through the windings let into the grooves, a magnetic field is created by the cumulative flux in all the ferrite legs. This flux finds its return primarily via the gap zone and magnetizes a magnetic tape located over the gap zone. The ferrite block combines many heads, which are manufactured together in one process.

By switched currents and correctly timed application of currents in the row and column directions, a magnetic field can be created in each individual gap. For this purpose, there is added to a signal applied to the data channels, which triggers winding currents in the rows, a rapidly switched selectioning current in the columns. The value of the magnetic flux resulting from the winding currents is chosen such that only the cumulative current from rows and columns can remanently magnetize the magnetic tape. Provided that the selectioning signal is chosen quickly enough, the stored energy in the inductance and the structure of the magnetized domains on the tape will not cause the drops in magnetization expected due to the intermittent losses of current to cause interference. The selectioning signal can consequently be used for various data lines in time-division multiplexing.

The tolerances occurring in the manufacture of recording heads in several, mutually separate production steps and in the assembly of this so-called matrix head leads to the individual recording heads being of very different quality with different magnetic properties of the recording heads of a matrix comprising ferrite block and applied thin-film gap, interference can occur due to stray fluxes.

SUMMARY OF THE INVENTION

The invention is based on the object of improving a method for the recording of digital signals on a magnetic tape in multiple longitudinal tracks by means of recording heads arranged in a matrix and a magnetic-tape recording apparatus for carrying out the process to the extent that different magnetic properties of the recording heads of a matrix are compensated.

The invention is based on the following considerations. With the currently used magnetic tapes of the ME (Metal Evaporated) and "advanced" MP (Metal Particle) types, the reproduction amplitude initially increases as a function of the magnetic flux in the gap of the recording head with increasing magnetic flux, reaches a maximum and, falling slightly at first, goes over into a flat portion. The increase in crosstalk from one track to the neighbouring track as a function of the magnetic flux in the gap of the recording head in disproportionately great with increasing magnetic flux. An increase in the magnetic flux is consequently to a great extent uncritical for the reproduction amplitude, but leads to an increase in the magnetic crosstalk.

In practice, the optimum range of magnetic flux at which crosstalk is still tolerable is very narrow, with the result that the operating point of the recording head must be maintained very precisely. Since the magnetic flux in the gap of the recording head depends both on the magnetizing current and on the production-dependent magnetic properties of the recording heads, it is difficult to fix a magnetizing current at which all the recording heads have their operating points in the optimum range. Therefore, with previous solutions, proselected arrangements of recording heads having largely identical magnetic properties had to be used. This is where the solution according to the invention comes in, allowing recording heads which are arranged in a matrix and have varying magnetic properties of the individual recording heads, such as typically occur in mass production, to be used.

This takes place by determining for each individual recording head in preliminary tests an individual magnetizing current for which the operating point of the recording head lies in the optimum range. The values determined for these individual magnetizing currents are stored and, on selection of the recording heads, that is to say on activation by data signals, the selected recording heads are supplied with their individual magnetizing current. As a result, different magnetic properties of the recording heads of a matrix are electronically compensated.

In a magnetic-tape recording apparatus for carrying out the process, the storage of the values takes place by means of memories which are connected to a control input of a controllable current source assigned to the rows and columns. The current sources are preferably controllable constant-current sources.

The memories are preferably digital memories with a downstream analog/digital converter whenever the current sources have analog control inputs.

Suitable as memories are non-volatile memories, such as for example PROKs, battery-backed RMIs, ferromagnetic RAMs or EEPROMs.

According to a development, values determined in preliminary tests for compensation currents in neighbouring recording heads may be additionally stored and, on selection of one of the recording heads, the neighbouring recording heads are supplied with the stored values of the compensation currents. An a result, the magnetic crosstalk can be further reduced, taking into consideration different magnetic properties of the recording heads.

Three alternatives are possible for the storage of the magnetizing currents and also compensation currents. For instance, there may be stored exclusively the values of the row currents at constant column currents or exclusively the values of the column currents at constant row currents or both the values of the row currents and the values of the column currents. Although the first two alternatives reduce the outlay on memory modules, they do not always permit complete compensation. Their application is of use only for a small number of columns or rows. Preference is therefore given to the third alternative, which permits complete compensation even when there are a multiplicity of rows and columns.

The values of the row currents and/or column currents may be stored as absolute values or relative deviations from a basic value. In the case of the second variant, the basic value may be formed by a mean value or a lower limit value or an upper limit value.

While the storage of absolute values requires a high resolution and consequently a high storage capacity for each stored value, the storage of deviations and a basic value manages with a smaller storage capacity, in particular if deviations are small. In addition, the second variant allows a simple readjustment when there are changes to the magnetic properties of the recording heads caused by ageing or adaptations to other tape material, by changing just the basic value. A precondition here is that the magnetic properties of the recording heads do not change in relation to one another.

The basic values with the deviations may be added in digital form before the digital/analog conversion or in analog form after the digital/analog conversion.

In a preferred configuration of the magnetic-tap recording apparatus, the recording heads arranged in the matrix form with the controllable current sources, the memories and the control circuit a structural unit in which the recording heads are arranged on the side facing the magnetic tape and the current sources, memories and the control circuit are arranged on the side facing away from the magnetic tape. As a result, the subassemblies which serve for controlling the recording heads can be assigned directly to them and can switch them directly, with the result that both short current paths exist and a definite assignment of the memories to the columns and rows of the matrix is ensured on installation of the structural unit.

BRIEF DESCRIPTION OF DRAWINGS

The invention is explained below with reference to the drawing, in which.

DETAILED DESCRIPTION OF INVENTION

Figure 1:
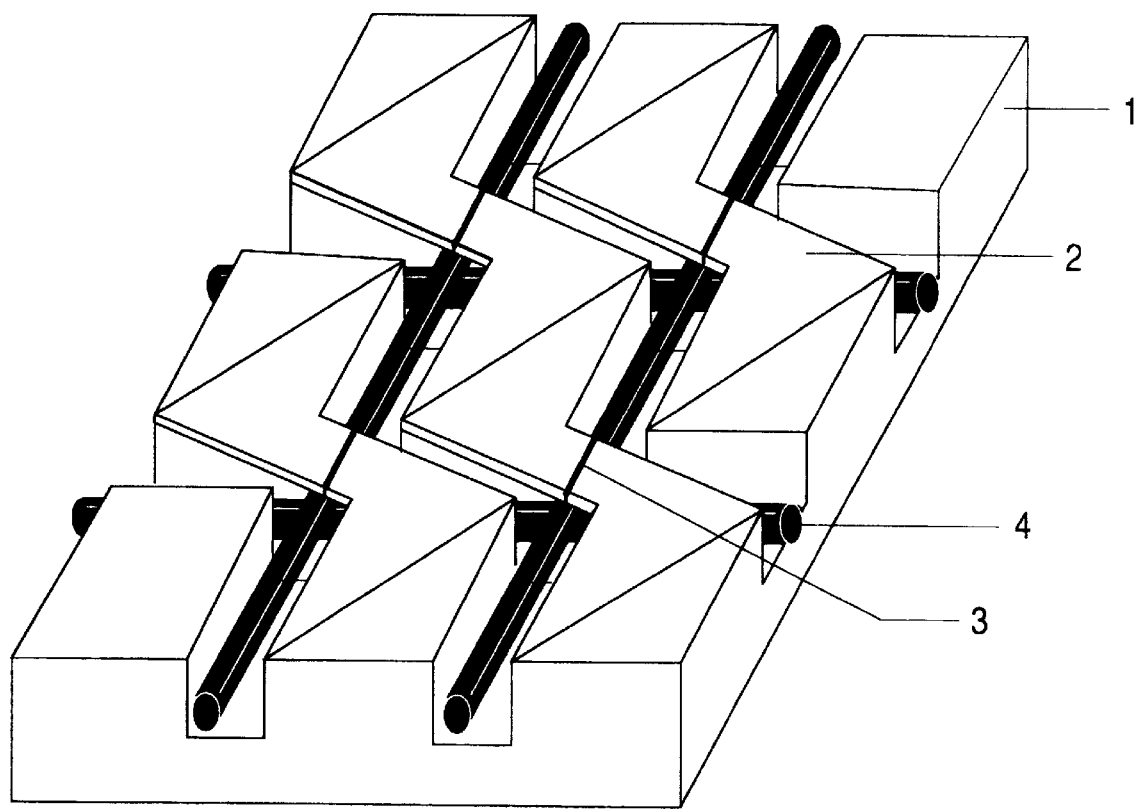
FIG. 1 shows a perspective representation of a matrix with recording heads.

FIG. 1 shows a perspective representation of a matrix with recording heads. These are manufactured together in one production process. A thin-film structure 2, which contains the magnetically effective gaps 3, is applied to a ferrite block 1 which is provided with grooves in the longitudinal and transverse directions. Windings 4 are let into the grooves and form rows and columns of a matrix. If current is passed through the windings 4, a magnetic field is created by the cumulative flux in all the ferrite legs. This flux finds its return primarily via the gap zone and magnetizes a magnetic tape located over the gap zone. By switched currents and correctly timed application of currents in the row and column directions, a magnetic field can be created in each individual gap 3.

Figure 2:
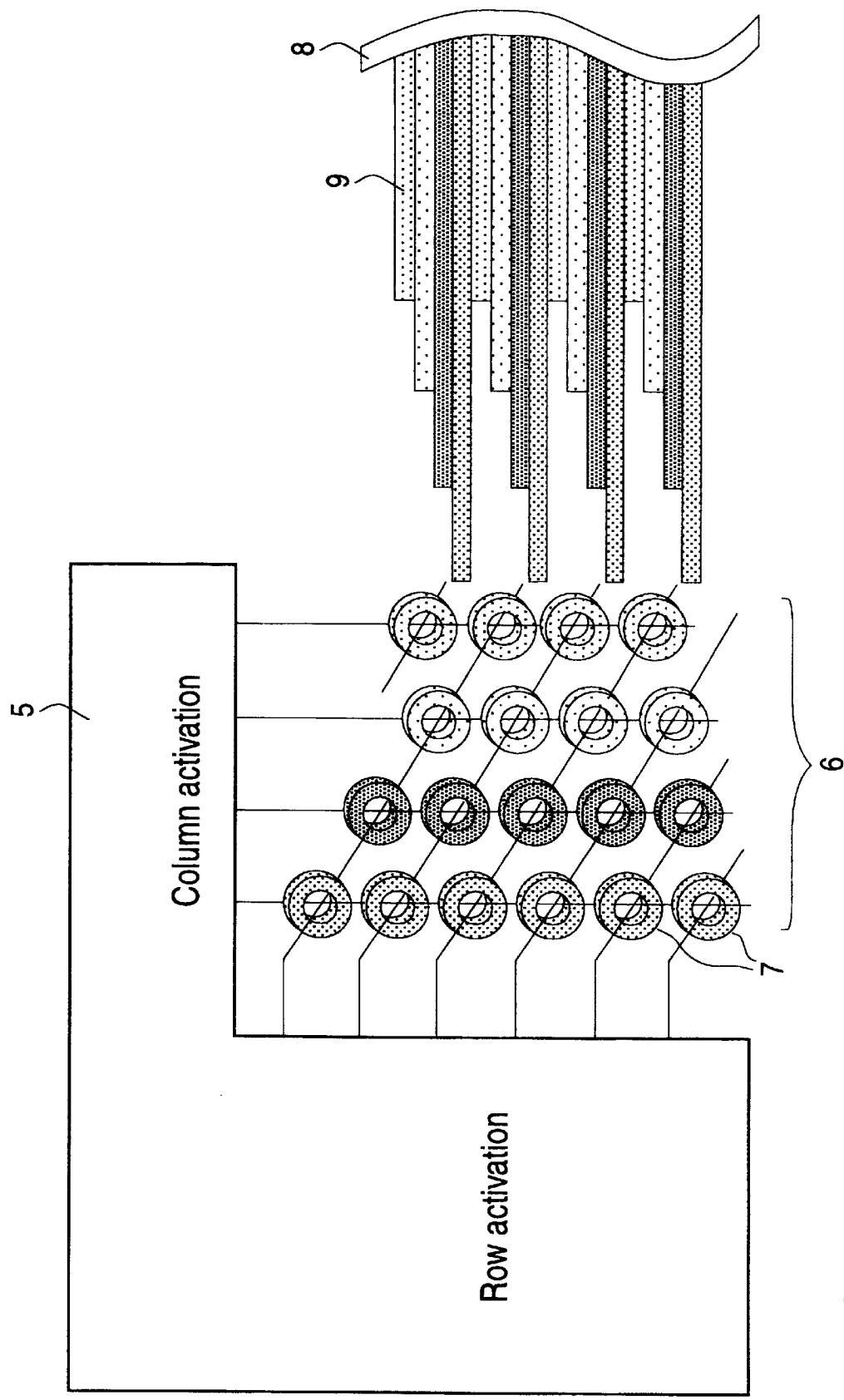
FIG. 2 shows a basic representation of a control unit with recording heads arranged in a matrix.

FIG. 2 shows a basic representation of a control unit 5 with recording heads 7 arranged in a matrix 6. To the right of the recording heads 7 there is shown part of a magnetic tape 8, on which the tracks 9 recorded by the recording heads are indicated. The recording heads 7 are supplied with current row-wise and column-wise by the control unit 5. The value of the magnetic flux resulting from the winding currents is chosen such that only the cumulative current from rows and columns can adequately, i.e. remanently, magnetize the magnetic tape 8.

Figure 3:
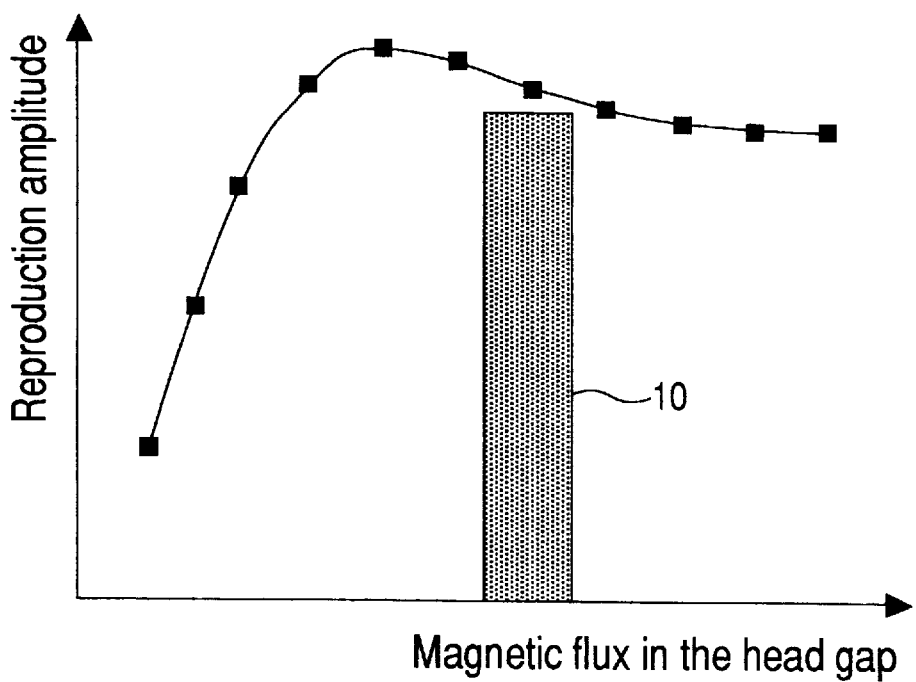
FIG. 3 shows a diagram with a qualitative representation of the reproduction amplitude as a function of the magnetizing current.

FIG. 3 shows a diagram with a qualitative representation of the reproduction amplitude as a function of the magnetic flux in the gap of a recording head, the magnetic flux in turn being a function of the magnetizing current. The reproduction amplitude initially increases with increasing magnetic flux, reaches a maximum and, after falling slightly at first, goes over into a flat portion.

Figure 4:
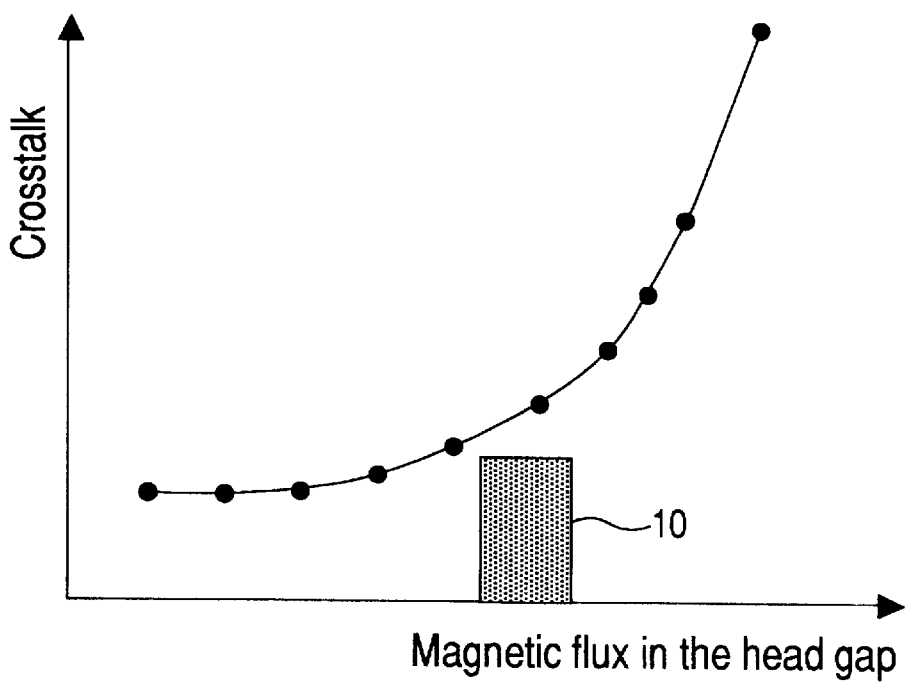
FIG. 4 shows a diagram with a qualitative representation of the magnetic crosstalk as a function of the magnetizing current and FIG. 5 shows a block diagram of the control unit from FIG. 2.

FIG. 4 shows a diagram with a qualitative representation of the magnetic crosstalk as a function of the magnetic flux in the gap of a recording head, the magnetic flux in turn being a function of the magnetizing current. The crosstalk from one track to the neighbouring track increases disproportionately with increasing magnetic flux.

To achieve a high reproduction amplitude with at the same time still tolerable magnetic crosstalk, a range of the magnetic flux which, with regard to reproduction amplitude, already lies in the flat portion and, with regard to magnetic crosstalk, does not yet lie in the steeply rising portion is chosen. This optimum range is marked as 10 in FIGS. 3 and 4.

Figure 5:
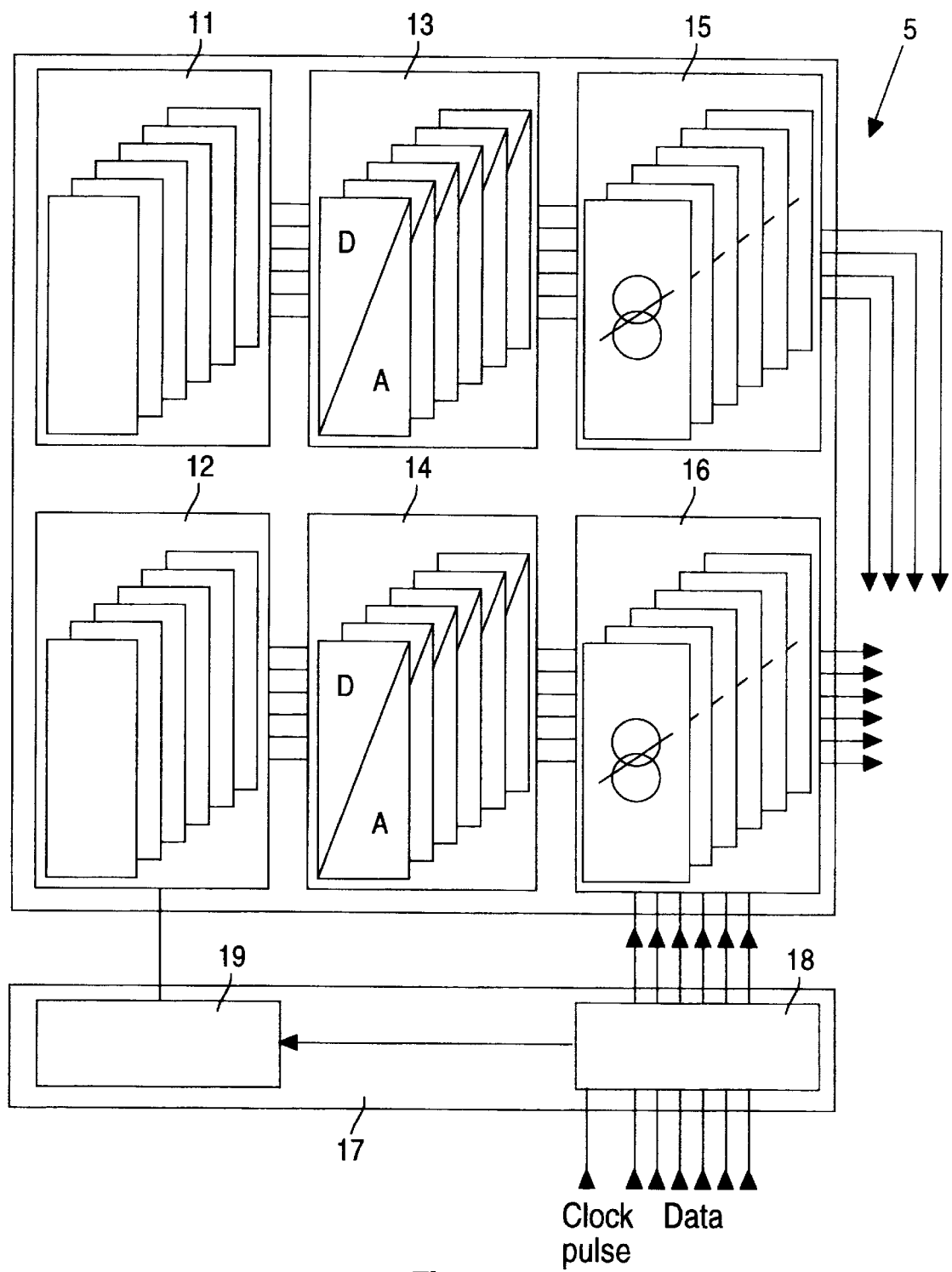

To maintain consistent operating points within the optimum range 10 when there are varying magnetic properties of the individual recording heads 7, as typically occur in mass production, there is provided a control unit 5 according to FIG. 5, by means of which different magnetic properties of the recording heads 7 of a matrix 6 are electronically compensated.

The control unit 5 comprises for each row and column a controllable constant-current source 16, 15, the control input of which is connected via a digital/analog converter 14, 13 to the output of a digital, non-volatile memory 12, 11, and furthermore a common control circuit 17 with a data buffer 18 and a counter 19. Stored in the memories 11, 12 are those values which were determined individually for each recording head 7 in a preceding setting operation. Criteria for the values determined are consistent operating points, that is to say the same magnetic fluxes of the gaps of the recording heads 7 with regard to the reproduction output signal and the magnetic crosstalk. In addition, the values of any necessary inverse crosstalk compensation currents of neighbouring recording heads are also determined.

Since the values for the magnetizing current and the compensation current for each individual recording head are stored in the non-volatile memories 11, 12, a unique pairing of recording head 7 and value memory 11, 12 is obtained. The stored values may be absolute values or deviations from a basic value. The basic value may be added in digital form or in analog form. In this case, the basic value may be either the lower current limit value, the mean current limit value or the maximum current limit value.

The digital signals to be recorded and a clock pulse are fed to the input of a buffer memory 18. The outputs of the buffer memory 18 select the current sources assigned to the rows. The respective value of the row component of the magnetizing current is fixed by means of the memories 12, assigned to the rows, which control the controllable current sources 16 of the rows by means of their digital/analog converters 14. The outputs of the counter 19 select the current sources 15 assigned to the columns. The respective value of the column component of the magnetizing current is fixed by means of the memories 11, assigned to the columns, which control the controllable current sources 15 of the columns by means of their digital/analog converters 13. The sum of row component and column component produces the magnetizing current of the respective recording head and the compensation currents of the neighbouring recording heads.

The value of the magnetic flux in the gaps of the recording heads may change due to ageing and wear, which has no influence on the tolerances of the recording heads with respect to one another. To be able to compensate this effect, it may be necessary to change the absolute value of the magnetizing current. This can be performed by changing the current source characteristic or, when a basic value is stored and there are deviations from the basic value, also by changing the basic value.

What is claimed is:

1. Process for the recording of digital signals on a magnetic tape in multiple longitudinal tracks by means of recording heads which are arranged in a matrix and are supplied with current row-wise and column-wise in dependence on the digital signals in a multiplex operation wherein the magnetic field resulting exclusively from row or column currents in the recording heads supplied with current in each case lies below the coercive field strength of the magnetic tape, while the magnetic field resulting from row and column currents superposed in the same sense in the respectively selected recording heads supplied with current lies above the coercive field strength of the magnetic tape and produces magnetized domains, wherein for each recording head a value determined in preliminary tests for the magnetizing current from row and column currents superposed in the same sense, for maintaining a desired operating point, is permanently stored in a non-volatile memory separate from the magnetic tape and, on selection, the recording heads are supplied with the stored values of the magnetizing current assigned to them.

2. Process according to claim 1, wherein values determined in preliminary tests for compensation currents in neighbouring recording heads are additionally stored in said non-volatile memory and, on selection of one of the recording heads, the neighbouring recording heads are supplied with the stored values of the compensation currents.

3. Process according to claim 1 wherein exclusively the values of the row currents at constant column currents or exclusively the values of the column currents at constant row currents or both the values of the row currents and the values of the column currents are stored in said non-volatile memory.

4. Process according to claim 3, wherein the values of the row currents and/or column currents are stored as absolute values.

5. Process according to claim 3, wherein the values of the row currents and/or column currents are stored as relative deviations from a basic value.

6. Process according to claim 5, wherein the basic value is formed by a mean value or a lower limit value or an upper limit value.

7. Process according to claim 5 wherein the basic values with the deviations are added in digital form before the digital/analog conversion or in analog form after the digital/analog conversion.

8. Process according to claim 1 wherein the values for the magnetizing current are stored in digital form and are converted into analog values for the controlling of current sources.

9. Magnetic tape recording apparatus comprising:

a plurality of recording heads for recording digital signals onto a magnetic tape, said recording heads being arranged in a matrix-type structure; and a control unit for electrically compensating for different magnetic properties of said plurality of recording heads, said control unit comprising:

controllable current sources connected to each of said recording heads;

at least one non-volatile memory separate from said magnetic tape in which is permanently stored individually determined and pre-set magnetic current values for each said recording head; and common controller circuit for selectively activating said current sources and said current values stored in the non-volatile memory in dependence on said digital signals to be recorded, wherein upon selection, said recording heads are supplied with the stored values of the magnetizing currents assigned to them.

10. The magnetic tape recording apparatus according to claim 9, wherein said non-volatile memory is designed as a digital memory connected via at least one digital/analog converter to a control input of each current source.

11. The magnetic tape recording apparatus according to claim 10, wherein the non-volatile memory comprises PROMs.

12. The magnetic tape recording apparatus according to claim 11, wherein the matrix arranged recording heads, the control unit, the controllable current sources, the non-volatile memory and the common control circuit constitute a structural unit in which the recording heads are arranged on the side facing the magnetic tape.

* * * * *